(12) United States Patent
Ogura et al.

(10) Patent No.: US 6,181,442 B1
(45) Date of Patent: Jan. 30, 2001

(54) CLOSE-CONTACT TYPE IMAGE SENSOR AND IMAGE READING APPARATUS USING THE SAME

(75) Inventors: Makoto Ogura, Sagamihara; Tatsundo Kawai, Hadano, both of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/990,169

(22) Filed: Dec. 12, 1997

(30) Foreign Application Priority Data

Dec. 27, 1996 (JP) ................................................ 8-350125

(51) Int. Cl.[7] ................................................ H04N 1/04
(52) U.S. Cl. .................................................... 358/475
(58) Field of Search .................................... 358/475, 474, 358/483, 509, 512, 513, 482; 250/208.1; 382/321

(56) References Cited

U.S. PATENT DOCUMENTS

| | | | |
|---|---|---|---|
| 4,787,749 | * 11/1988 | Ban ...................................... | 356/381 |
| 5,350,914 | * 9/1994 | Hotta ................................... | 250/208.1 |
| 5,357,099 | * 10/1994 | Tabata et al. ....................... | 358/475 |
| 5,412,485 | * 5/1995 | Kashiwagi .......................... | 358/441 |
| 5,434,681 | * 7/1995 | Imamura et al. ................... | 358/471 |
| 5,442,466 | * 8/1995 | Kameyama et al. ................ | 358/498 |
| 5,473,149 | * 12/1995 | Miwa ................................... | 235/472 |
| 5,489,995 | * 2/1996 | Iso et al. ............................. | 358/483 |
| 5,500,738 | * 3/1996 | Noguchi .............................. | 358/300 |
| 6,056,196 | * 5/2000 | Konishi .............................. | 235/454 |

* cited by examiner

*Primary Examiner*—Jerome Grant, II
(74) *Attorney, Agent, or Firm*—Robin, Blecker & Daley

(57) ABSTRACT

For preventing occurrence of interference fringes derived from interference of light rays on a contact plane between a contact glass and a cover glass, and thus homogenizing an output wave that may otherwise undergo the adverse effect of interference fringes, a close-contact type image sensor includes a contact glass arranged to come into contact with a read surface of an original, a light source for irradiating light to the read surface, an image forming lens for converging light reflected from the read surface, an image sensor part for reading an image of the original formed on an image plane of the image forming lens, and a cover glass for fixing the light source and the image forming lens at respective predetermined positions in a housing, wherein an air layer is present between the contact glass and the cover glass.

25 Claims, 5 Drawing Sheets

DIRECTION OF MOVEMENT OF ORIGINAL

DIRECTION OF MOVEMENT OF IMAGE READING APPARATUS

CLOSE-CONTACT TYPE IMAGE SENSOR AND IMAGE READING APPARATUS USING THE SAME

BACKGROUND OF THE INVENTION

1. Field of the Invention

The present invention relates to an image sensor capable of being employed in a facsimile system, copier, scanner, or the like for reading light reflected from a read surface, and to an image reading apparatus using the image sensor.

2. Description of Related Art

In the past, a close-contact type image sensor using a sensor array to form a read image on a one-to-one reduced scale and thus read an image from a read original with the size of the image unchanged has been used as an original reading device to be employed in a facsimile system, copier, scanner, or the like.

A known method is, as described in Japanese Patent Publication No. Hei 8-34531, such that a rod lens array and a line light source are fixed directly to a housing by performing affixation or the like, and then a contact glass is fixed to the housing. However, the work is complex. Besides, since the rod lens array and the line light source are affixed mutually independently, a positional deviation is likely to occur. There is the fear of a failure to read an image properly.

FIG. 7 is a sectional view of a known example of a close-contact type image sensor in which the above drawbacks are taken into account. The close-contact type image sensor has a housing 1 serving as a supporting means in which a sensor substrate 10 on which a sensor part 4 composed of a plurality of sensor chips for defining the locations of a plurality of pixels and for carrying out photoelectric conversion, and a protective film for protecting the plurality of sensor chips are mounted, and an optical member 3 including light sources 13 attached to an end face thereof for irradiating light to a read original, a rod lens array 2 that is a lens for forming an image read from the read original as the pixels on the surface of the sensor part 4, and a contact glass 5 serving as an original reading plane, are mounted. Attached to the sensor substrate 10 are an image processing circuit 11 for processing an image signal read by the sensor part 4 composed of the sensor chips and a connection part 12 for externally outputting an output signal of the close-contact type image sensor. The rod lens array 2 and the optical member 3 are pressed to the housing 1 by the contact glass 5. The contact glass 5 is fixed to the housing 1 by performing affixation or the like.

However, in this known example, since the contact glass 5 determines the focal length of the rod lens array 2, there is no range of choice in determining the thickness of the contact glass 5. Therefore, a special glass having a specific thickness must be custom-made.

In recent years, the number of scenes in which color images are handled has increased with the prevalence of color printers and color displays. There is an increasing demand for reading of color originals rather than conventional monochrome originals.

When a close-contact type image sensor is used to read a color original, light emitted from a light source and falling on the original reading plane must be multi-color light so that the color original can be read. In general, trichromatic light of red, green, and blue is used as light incident on the original reading plane. Three light sources mutually separated to be associated with the three colors or a single light source formed with a recently-developed white LED for emitting white light having the three colors mixed therein is included in the close-contact type image sensor.

Moreover, studies have been made of a close-contact type image sensor for reading a color original, in which light reflected from the original reading plane and segmented into colors is passed through a rod lens array that is a lens for forming an image as pixels on the surfaces of sensor chips, guided to the plurality of sensor chips arranged to define the locations of pixels and designed to carry out photoelectric conversion, and then photoelectrically converted color by color.

An information processing apparatus using the close-contact type image sensor, for example, a scanner, may adopt either a flat-bed system or a sheet-through system.

The flat-bed system is such that a book or any other original is placed on a top glass with an information side thereof facing the top glass, and a close-contact image sensor opposed to the information side is moved to read image information from the original.

By contrast, the sheet-through system is such that mutually-independent original sheets are moved one by one while brought into close contact with a close-contact type image sensor.

In the known example, for coping with both the systems, the contact glass 5 must be replaced with another.

The prior art will be described in conjunction with FIGS. 5 and 6. FIG. 5 is a sectional view showing the structure of a close-contact type image sensor of the sheet-through system. FIG. 6 is a sectional view showing the structure of a close-contact type image sensor of the flat-bed system. The structure in accordance with the prior art will be described. That is to say, an optical member 3 serving as a light source unit including light sources 13 and a rod lens array 2 are pressed from above in the drawing by means of a cover glass 6 and located at desired positions in a housing 1. The cover glass and a housing 1 are secured by performing affixation or the like. As a result, the optical member 3 and the rod lens array 2 are fixed to the housing 1.

A sensor part 4 mounted on a sensor substrate 10 is formed by placing a sensor array on the sensor substrate 10, electrically connected to an image processing circuit 11, resistor, and capacitor, and also electrically connected to a connection part 12 enabling connections with external circuits.

In FIG. 5, the contact glass 5 which is arranged to be brought into contact with an original P is fixed to the cover glass 6. The reasons therefor will be described below.

(i) The thickness of a glass matching the focal length of the rod lens array 2 can be set to a selected value more easily by forming the glass with two glasses of the contact glass 5 and cover glass 6 than by forming the glass with a single glass. Consequently, at least the rod lens array 2 and the optical member 3 can be fixed at the same time.

(ii) For the one kind of housing 1, either the flat-bed system or the sheet-through system can be selected depending on the presence or absence of the contact glass 5.

In FIG. 6, the contact glass 5 is removed, and a top glass 9 is disposed in such a way as to ensure an optically equivalent structure. The optical member 3 serving as a light source unit uses a light guide to diffuse light rays emitted from the light sources (LEDs) 13 located at both ends in a longitudinal direction of the optical member 3, and to guide the diffused light to an original P. The original P is then illuminated with the light. Light reflected from the original P passes through the rod lens array 2, forms an image on the sensor part 4, and is then converted into an electrical signal. For reading a color image, LEDs for emitting light rays of three colors of red, green, and blue are included and lit.

However, as far as the foregoing close-contact type image sensor of the prior art is concerned, even when the surfaces of the contact glass 5 and the cover glass 6 shown in FIG. 5 which are in contact with each other are flattened to as great an extent as mechanically and economically possible, a gap of several um deep would exist partly on a contact plane 20 between the contact glass 5 and the cover glass 6. Therefore, interference fringes are produced by interference of light. Accordingly, an output wave undergoes the adverse effect of interference fringes and exhibits inhomogeneities associated with the interference fringes.

Moreover, the depth of the gap varies depending on the pressure given by a roller used to transport an original or depending on ambient temperature or humidity. The output wave varies accordingly. This poses a problem that since correction cannot be achieved properly, a read error occurs.

For reading especially a color image, when light rays with long wavelengths interfere with one another, interference fringes are likely to occur. The wavelengths of red, green, and blue light rays become different because of the interference fringes. Consequently, the problem that a color deviation occurs in read data becomes outstanding. The adverse effect of the interference fringes becomes more serious than that occurring when a monochrome image is read.

BRIEF SUMMARY OF THE INVENTION

An object of the present invention is to solve the foregoing problems.

To attain the above object, in accordance with an aspect of the present invention, there is provided an image sensor which comprises a contact glass arranged to come into contact with a read surface of an original, a light source for irradiating light to the read surface, an image forming lens for converging light reflected from the read surface, an image sensor part for reading an image of the original formed on an image plane of the image forming lens, and a cover glass for fixing the light source and the image forming lens at respective predetermined positions in a housing, wherein an air layer is present between the contact glass and the cover glass. Accordingly, image reading can be achieved with high definition while being unaffected by interference fringes.

Further, the depth of the air layer is 50 $\mu$m or more. Moreover, by removing the contact glass, the close-contact type image sensor coping with the sheet-through system can be remodeled to cope with the flat-bed system.

Other objects and features of the present invention will be apparent from the following detailed description of preferred embodiments thereof taken in conjunction with the accompanying drawings.

DETAILED DESCRIPTION OF THE INVENTION

Hereinafter, preferred embodiments of the present invention will be described in detail with reference to the drawings.

First Embodiment

Figure 1:
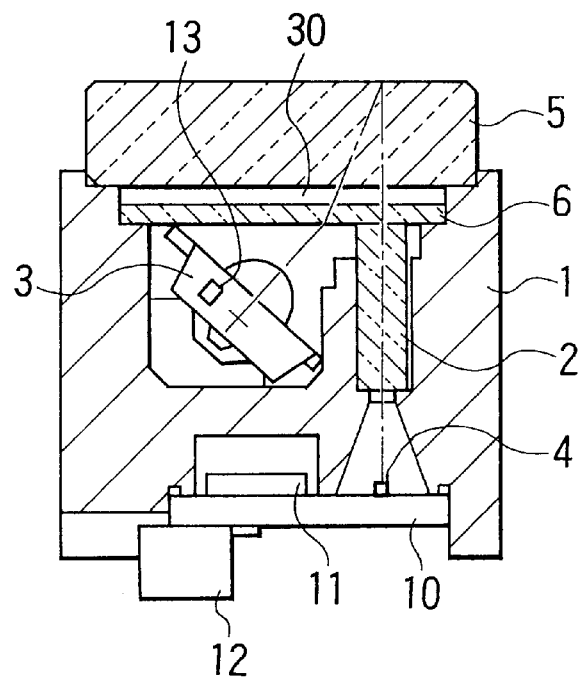
FIG. 1 is a sectional view showing a close-contact type image sensor in accordance with a first embodiment of the present invention.

FIG. 1 is a sectional view of a close-contact type image sensor in accordance with the first embodiment of the present invention. The close-contact type image sensor has a housing 1 serving as a supporting means in which a sensor substrate 10 on which a sensor part 4 composed of a plurality of sensor chips for defining the locations of pixels and carrying out photoelectric conversion and a protective film, which is not shown, for protecting the plurality of sensor chips are mounted, an optical member 3 including light sources 13 such as LEDs for irradiating light to a read original, a rod lens array 2 that is a lens for forming an image read from the read original as the pixels on the surface of the sensor part 4, a contact glass 5 serving as an original reading plane, and a cover glass 6 separated from the contact glass 5 by a gap, are mounted. Moreover, attached to the sensor substrate 10 are an image processing circuit 11 for processing an image signal read by the sensor part 4 composed of the sensor chips, and a connection part 12 for externally outputting an output signal of the close-contact type image sensor. Moreover, the cover glass 6 and the rod lens array 2 are in contact with each other.

The focal length of the rod lens array 2 employed in the first embodiment is 4.8 mm in the air. If one glass that is the contact glass 5 is used, the thickness of the contact glass must be 7.2 mm in consideration of the refractive index of the glass. A glass having such a thickness is unavailable in standard models and, therefore, becomes very special and expensive.

However, when the contact glass 5 is combined with the cover glass 6, the thicknesses of the contact glass 5 and the cover glass 6 may be set to 6 mm and 1.2 mm, respectively. Thus, a glass capable of covering the focal length of the rod lens array 2 can be realized at low cost.

However, when the glasses are merely assembled, the aforesaid problem of interference fringes takes place. The reasons therefor will be explained slightly in detail below. Assume that the depth of an air layer between the contact glass 5 and the cover glass 6 is d, the refractive index of air is n (approximately equal to "1"), and the wavelength of a light flux is $\lambda$. For example, when light is incident vertically, an effect of interference varies depending on whether a quotient given by the expression below is an integer or half integer.

$$(nd)/\lambda \qquad (1)$$

Accordingly, a transmittance varies. The depth of the air layer, d, varies depending on the flatness of a transparent member, accuracy in maintaining a gap, or any other factor of differentiating one product from another, and is, therefore, different from position to position. The difference leads to a difference in transmittance from position to position. Eventually, interference fringes appear.

In general, the wavelengths of light emitted from a light source, $\lambda$, are not confined to one wavelength but constitute a spectrum. Assuming that a wavelength half-width of the spectrum is $\Delta\lambda$ and a center wavelength of the emitted light is $\lambda_0$, if the following relationship is established:

$$[\{(nd)/(\lambda_0-\Delta\lambda)\}-\{(nd)/(\lambda_0+\Delta\lambda)\}] > \frac{1}{2} \quad (2),$$

interference in which light rays mutually intensify and interference in which light rays mutually attenuate occur among light rays with wavelengths in the spectrum. Consequently, interference fringes become indiscernible. The larger the value of the above left side is, the less discernible interference fringes are. Normally, the value should be equal to or larger than "5".

The following is deduced from the above:

(i) As the depth of the air layer, d, becomes larger, interference fringes become more indiscernible.

(ii) As the center wavelength, $\lambda_0$, becomes larger, interference fringes become more discernible.

(iii) As the wavelength half-width, $\Delta\lambda$, becomes smaller, interference fringes become more discernible.

On the other hand, for reading a monochrome image, a light source glowing in green is used generally. However, for reading a color image, light sources glowing in red, green, and blue, respectively, are needed. In this case, interference fringes caused by red light whose center wavelength $\lambda_0$ is long pose a problem.

In the first embodiment, LED chips are used as light sources glowing in red, green, and blue. The center wavelength $\lambda_0$ of the LED glowing in green with high luminance ranges from about 510 to 530 nm and is thus rather short. An LED for emitting light whose center wavelength is rather short or about 600 to 630 nm is used as the LED glowing in red. However, as far as an LED chip capable of glowing with high luminance in the spectrum is concerned, a wavelength half-width of the spectrum, $\Delta\lambda$, is as small as about 20 nm. This facilitates occurrence of the problem of interference fringes.

In the first embodiment, if a value provided by the above expression:

$$[\{(nd)/(\lambda_0-\Delta\lambda)\}-\{(nd)/(\lambda_0+\Delta\lambda)\}] \quad (3)$$

should be equal to or larger than "5", the depth of the air layer, d, must be equal to or larger than approximately 50 $\mu$m.

In the first embodiment, the thickness of the contact glass 5 is 5 mm, the thickness of the cover glass 6 is 1 mm, and the depth of the air layer, d, is 0.8 mm.

In FIG. 1, while the rod lens array 2 and the optical member 3 are, like those in the prior art, fixed to the housing 1 by means of the cover glass 6, the contact glass 5 is fixedly secured to the housing 1, and a gap 30 is intentionally provided between the contact glass 5 and the cover glass 6, thus preventing occurrence of interference fringes. The gap 30 should preferably be defined according to the flatness of the parts so that the contact glass 5 and the cover glass 6 will not come into contact with each other and will be separated from each other by 50 $\mu$m or more. Herein, as mentioned above, the gap 30 is 0.8 $\mu$m deep. This numerical value is a value permitting the contact glass 5 and the cover glass 6 to be kept apart even when the contact glass 5 is pressed due to the weight of an original or the rotation of a roller. With the gap 30, a variation of the distance (focal length) from the rod lens array 2 to the sensor part 4 due to the pressing is quite limited. Therefore, the level of a signal representing a read image remains homogeneous.

Second Embodiment

Figure 2:
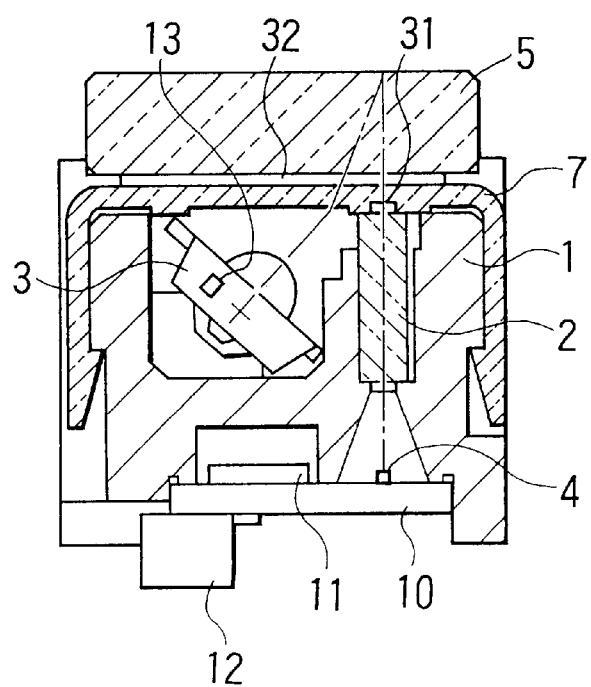
FIG. 2 is a sectional view showing a close-contact type image sensor in accordance with a second embodiment of the present invention.
Figure 3:
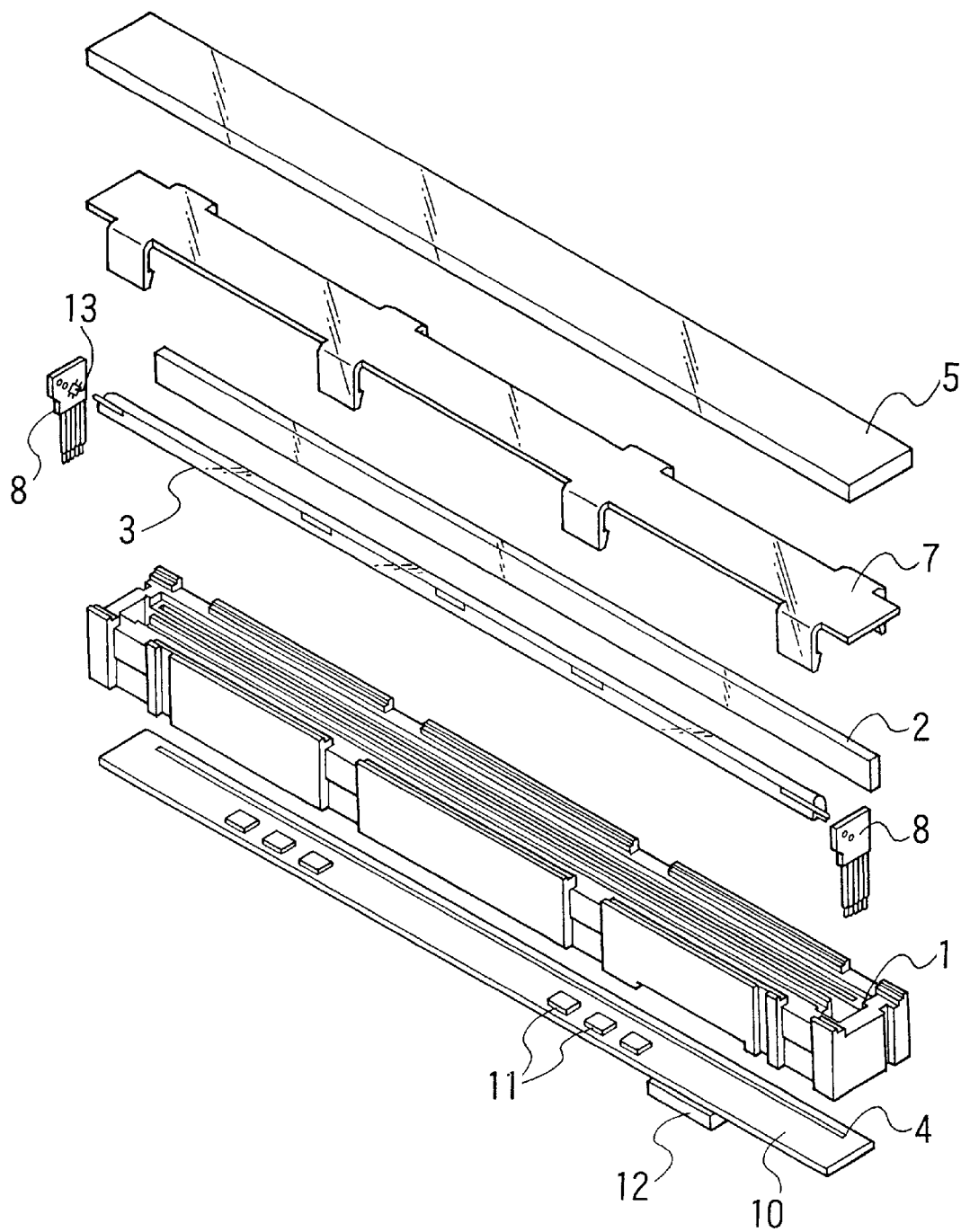
FIG. 3 is an exploded perspective view showing the structure of the close-contact type image sensor in accordance with the second embodiment.

FIG. 2 is a sectional view of a close-contact type image sensor in accordance with the second embodiment of the present invention. FIG. 3 is an exploded perspective view for explaining the structure of the image sensor.

The second embodiment is an improvement of the first embodiment described with reference to FIG. 1. In view of the fact that a gap of several $\mu$m deep might be present between the rod lens array 2 and the cover glass 6 in the first embodiment shown in FIG. 1, the structure of the second embodiment is intended to prevent interference fringes from occurring due to the gap between the rod lens array 2 and the cover glass 6.

In the second embodiment, in place of the cover glass 6, there is provided a cover member 7 having a concave part thereof formed as a gap 31 in an optical area thereof that is an area in contact with the rod lens array 2. Preferably, the cover member 7 and the rod lens array 2 should be separated from each other by 50 $\mu$m or more. In the second embodiment, they are separated from each other approximately by 150 $\mu$m.

Likewise, a gap 32 is created between the contact glass 5 and the cover member 7. In the second embodiment, as shown in FIG. 3, the cover member 7 is made of a transparent material such as polycarbonate or an acrylic. After the optical member 3 having substrates 8 that include light sources 13 such as LEDs attached to both ends thereof and also having a light guide member exhibiting high scattering efficiency between the substrates 8, and the rod lens array 2 are set to the housing 1, the cover member 7 is snapped down and fitted into the housing 1 from above in order to fix the optical member 3 and the rod lens array 2 to the housing 1. Thus, assembling is easy to do. This leads to improved productivity.

While the cover member 7 is made of a transparent material, the cover member 7 alternatively may be a sheet metal having a slit, for the purpose of attaining the same object.

In FIG. 3, the substrates 8 each have an LED mounted as the light source 13 thereon, each include a lead over which electric power is supplied, and are fixed to both ends of the optical member 3. After being assembled, the leads are linked to a substrate 10 of the sensor part 4 by performing soldering or the like so that the leads can be linked to a power supply by way of the substrate 10 of the sensor part 4 and the connection part 12.

Since a transparent material such as polycarbonate or an acrylic is used as the material of the optical member 3, expansion and contraction derived from an ambient change in heat or humidity are expected. For minimizing a positional deviation between the light sources 13 and the optical member 3 caused by expansion and contraction, the substrates 8 having the LEDs mounted thereon and the optical member 3 are mutually fixed. The fixing method may include caulking, affixation, and snap and fit.

The positions in a longitudinal direction of the housing 1 and the optical member 3 should preferably be determined in consideration of the foregoing expansion and contraction dependent on temperature and humidity. The longitudinal center of the optical member 3 is positioned to be fitted with a groove or projection (not shown) formed in the center of the housing 1. Moreover, the sensor part 4 is fitted into a groove in the housing 1 and then fixed by performing affixation, caulking, or snap and fit. After the cover member 7 is snapped down and fitted into the housing 1, the contact glass 5 is affixed to the housing 1.

The foregoing description has been made by taking the sheet-through system for instance. In the case of the flat-bed system, the contact glass 5 is not included but a top glass is disposed serving as the contact glass 5.

Figure 4:
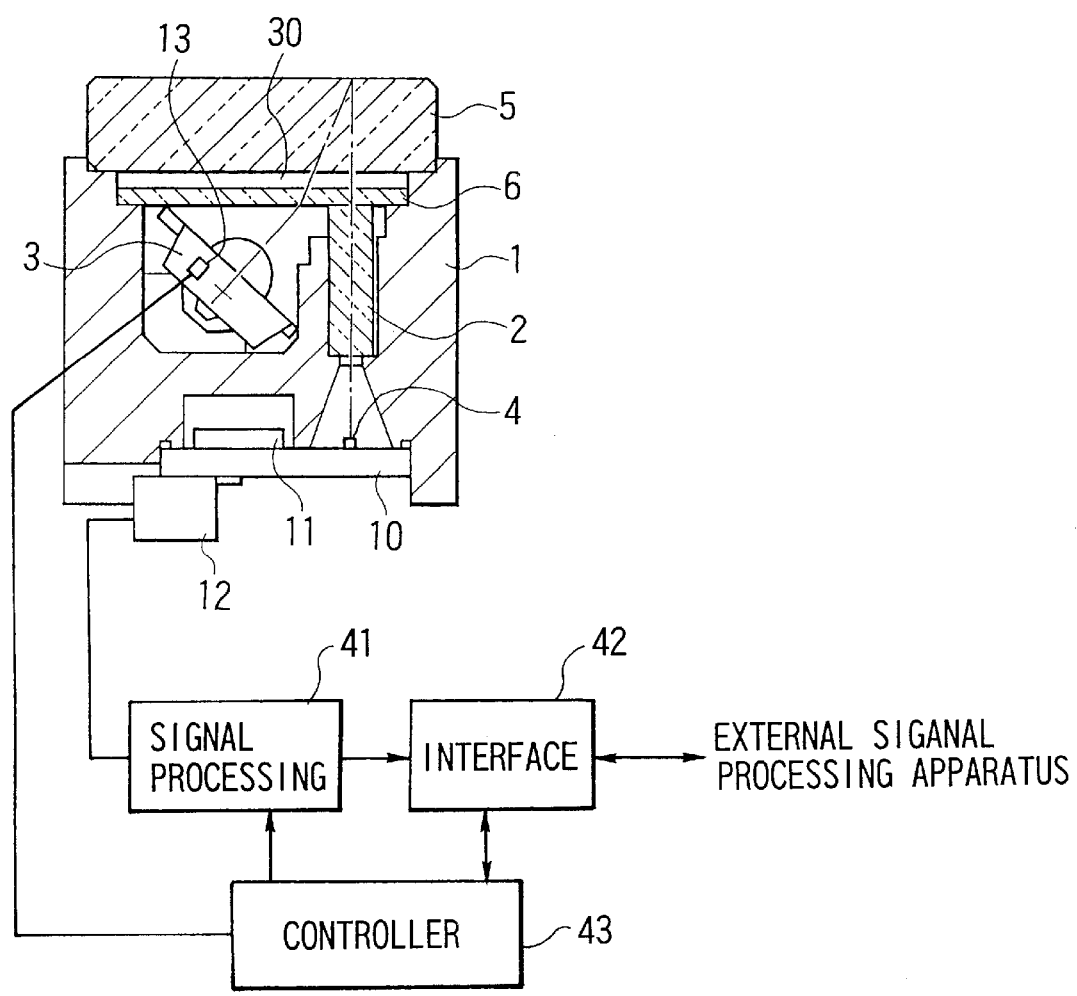
FIG. 4 is a circuit diagram showing a scanner having the close-contact type image sensor in accordance with the first embodiment.
Figure 5:
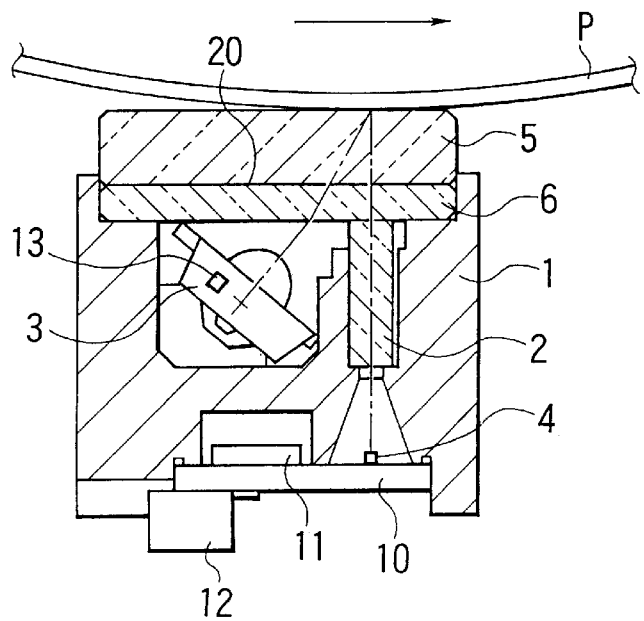
FIG. 5 is a sectional view showing a close-contact type image sensor of the sheet-through system in accordance with a prior art.
Figure 6:
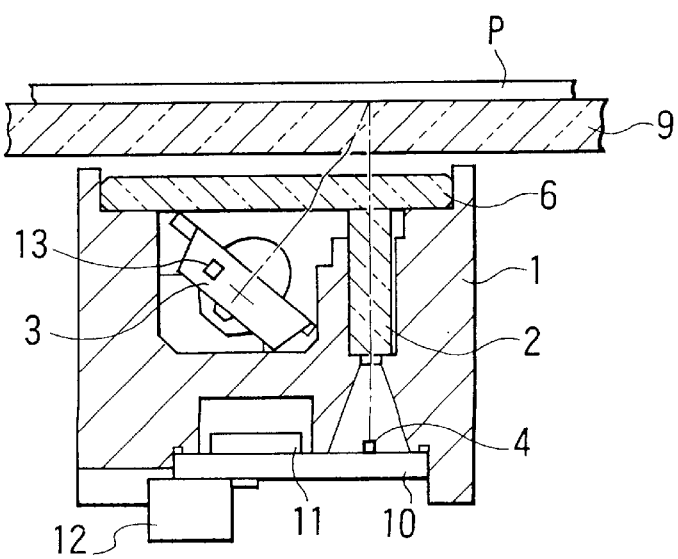
FIG. 6 is a sectional view showing a close-contact type image sensor of the flat-bed system in accordance with the prior art.
Figure 7:
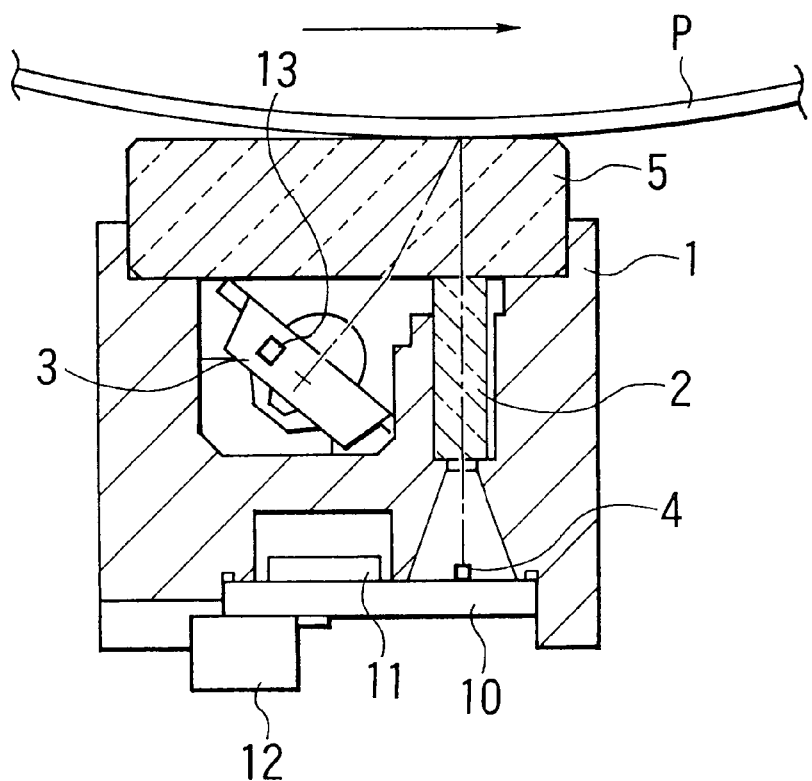
FIG. 7 is a sectional view showing a known example of a close-contact type image sensor of the sheet-through system.

FIG. 4 is a circuit diagram showing a scanner in which the close-contact type image sensor in accordance with the first embodiment, for example, is incorporated.

Referring to FIG. 4, a signal processing circuit 41, which includes an A/D converter, is arranged to process a signal outputted from the connection part 12 of the close-contact type image sensor. An interface circuit 42 is arranged to perform bilateral communications with an external signal processing apparatus, such as a personal computer, i.e., to receive commands from the external signal processing apparatus and send image signals processed by the signal processing circuit 41 to the external signal processing apparatus. A controller 43, such as a CPU (central processing unit), is arranged to synchronously control the signal processing circuit 41, the interface circuit 42 and the light sources 13.

The structure of the close-contact type image sensor has been described mainly. The close-contact type image sensor is incorporated in an image reading part of an image reading apparatus, such as a scanner. For reading especially a color image, since occurrence of interference fringes can be prevented, an image signal permitting high image quality can be produced.

What is claimed is:

1. An image sensor comprising:
   a contact glass supported by a housing and arranged to come into contact with a read surface of an original;
   a light source for irradiating light to the read surface;
   an image forming lens for converging light reflected from the read surface;
   an image sensor part for reading an image of the original formed on an image plane of said image forming lens; and
   a cover glass for fixing said image forming lens at a predetermined position in said housing, so that an air layer is formed between the contact glass and said cover glass.

2. An image sensor according to claim 1, wherein a depth of said air layer is 50 µm or more.

3. An image sensor according to claim 1, wherein said image sensor is used in a flat-bed scanner system or a sheet-through scanner system.

4. An image reading apparatus using said image sensor according to one of claims 1 to 3.

5. An image sensor according to claim 1, wherein a further air layer is formed between said image forming lens and said cover glass.

6. An image sensor according to claim 5, wherein a depth of said further air layer is 50 µm or more.

7. An image sensor according to claim 1, wherein said cover glass further fixes said light source at a predetermined position in said housing.

8. An image reading system comprising:
   a) an image sensor including:
      a contact glass supported by a housing and arranged to come into contact with a read surface of an original;
      a light source for irradiating light to the read surface;
      an image forming lens for converging light reflected from the read surface;
      an image sensor part for reading an image of the original formed on an image plane of said image forming lens; and
      a cover glass for fixing said image forming lens at a predetermined position in said housing, so that an air layer is formed between said contact glass and said cover glass;
   b) a signal processing circuit for processing an image signal read out from said image sensor part;
   c) an interface circuit for bilateral communications with an external signal processing apparatus; and
   d) a controller for controlling said light source, said signal processing circuit and said interface circuit.

9. An image reading system according to claim 8, wherein a further air layer is formed between said image forming lens and said cover glass.

10. An image reading system according to claim 9, wherein a depth of said further air layer is 50 µm or more.

11. An image reading system according to claim 8, wherein said signal processing circuit includes an A/D converter.

12. An image reading system according to claim 8, wherein said signal processing includes a central processing unit.

13. An image reading system according to claim 8, wherein said cover glass further fixes said light source at a predetermined position in said housing.

14. An image reading system according to claim 8, wherein a depth of said air layer is 50 µm or more.

15. An image sensor comprising:
   an image forming lens for converging light read from a read surface of an original;
   an image sensor part for reading an image of the original formed on an image plane of said image forming lens; and
   a cover glass for fixing said image forming lens at a predetermined position in a housing, so that an air layer is formed on a light-incident area of said image forming lens between said image forming lens and said cover glass.

16. An image sensor according to claim 15, further comprising a light source for irradiating light to the read surface of the original.

17. An image sensor according to claim 15, wherein a depth of said air layer is 50 µm or more.

18. An image sensor according to claim 15, wherein said cover glass further fixes said light source at a predetermined position in said housing.

19. An image sensor according to claim 15, wherein said image sensor is used in a flat-bed scanner system or a sheet-through scanner system.

20. An image reading apparatus using said image sensor according to one of claims 15–19.

21. An image reading system comprising:
   a) an image sensor including:
      a light source for irradiating light to a read surface of an original;
      an image forming lens for converging light from the read surface;
      an image sensor part for reading an image of the original formed on an image plane of said image forming lens; and
      a cover glass for fixing said image forming lens at a predetermined position in a housing, so that an air layer is formed on a light-incident area of said image forming lens between said image forming lens and said cover glass;

b) a signal processing circuit for processing an image signal read out from said image sensor part;

c) an interface circuit for bilateral communications with an external signal processing apparatus; and d) a controller for controlling said light source, said signal processing circuit and said interface circuit.

22. An image reading system according to claim 21, wherein a depth of said air layer is 50 $\mu$m or more.

23. An image reading system according to claim 21, wherein said cover glass further fixes a light source at a predetermined position in said housing.

24. An image reading system according to claim 21, wherein said signal processing circuit includes an A/D converter.

25. An image reading system according to claim 21, wherein said controller includes a central processing unit.

* * * * *

UNITED STATES PATENT AND TRADEMARK OFFICE
CERTIFICATE OF CORRECTION

PATENT NO. : 6,181,442 B1 Page 1 of 1
APPLICATION NO. : 08/990169
DATED : January 30, 2001
INVENTOR(S) : Makoto Ogura et al.

It is certified that error appears in the above-identified patent and that said Letters Patent is hereby corrected as shown below:

Col. 2, line 38, after "cover glass" insert -- 6 --.
Col. 3, line 10, delete "um" and insert --$\mu$m --.
Col. 4, line 56, delete "therefor" and insert -- therefore --.

Signed and Sealed this

Fifth Day of December, 2006

JON W. DUDAS
*Director of the United States Patent and Trademark Office*